(No Model.)

L. W. HEELAN.
INFLATABLE TIRE.

No. 606,141.  Patented June 21, 1898.

Witnesses
Edmund A. Strauss
H. F. Beruhof

Inventor
Lawrence W. Heelan
by Edson Bros,
Attorneys.

THE NORRIS PETERS CO., PHOTO-LITHO., WASHINGTON, D. C.

UNITED STATES PATENT OFFICE.

LAWRENCE W. HEELAN, OF DALLAS, TEXAS, ASSIGNOR OF ONE-HALF TO WALTER S. STONE, OF SAME PLACE.

INFLATABLE TIRE.

SPECIFICATION forming part of Letters Patent No. 606,141, dated June 21, 1898.

Application filed February 9, 1897. Serial No. 622,644. (No model.)

*To all whom it may concern:*

Be it known that I, LAWRENCE W. HEELAN, a citizen of the United States, residing at Dallas, in the county of Dallas and State of Texas, have invented certain new and useful Improvements in Inflatable Tires; and I do hereby declare the following to be a full, clear, and exact description of the invention, such as will enable others skilled in the art to which it appertains to make and use the same.

My invention relates to improvements in inflatable tires for bicycles, as well as for wheeled vehicles generally; and the object that I have in view is to provide a non-puncturable tire of simple compact construction which can be manufactured at a low cost.

The invention consists in a composite tire in which the puncture-resisting medium is a tube of rawhide which incloses and protects the inner fabric tube designed to receive the inflating medium, such as compressed air. The armor-like tube of rawhide is itself inclosed within a tube composed of two layers of fabric with the warp and woof of the respective layers arranged to cross each other at an angle, and the whole is inclosed within a rubber sheath-like tube forming the tread-surface of the tire; and the invention further consists in the peculiar construction and arrangement of parts which will be hereinafter fully described and claimed.

I have illustrated the preferred embodiment of my invention in the accompanying drawings, forming a part of this specification, in which—

Figure 1:
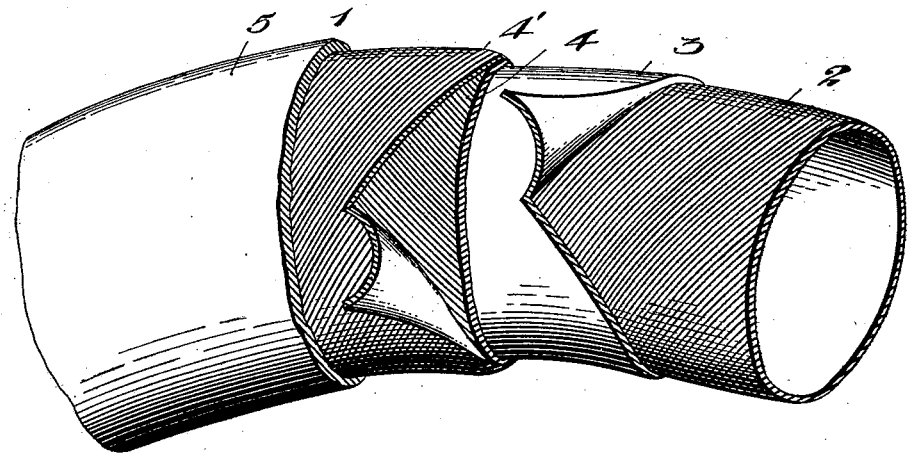
Figure 2:
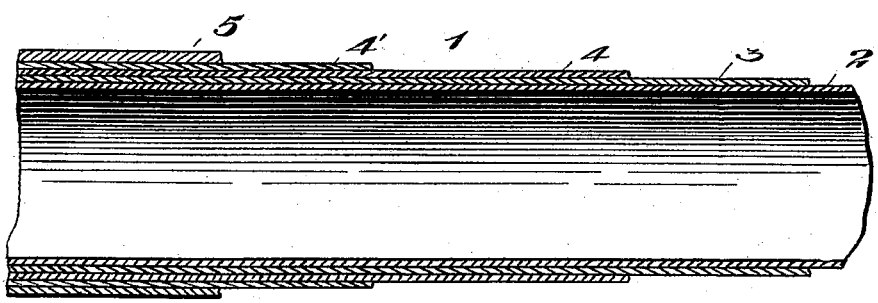

Figure 1 is a perspective view of a part of my tire, with the several tubes partially broken away to show the interior. Fig. 2 is a longitudinal sectional view.

Like numerals of reference denote corresponding parts in both figures of the drawings, referring to which—

1 designates the tire, which as a whole consists of a series of tubes made of different materials inclosed one within the other to present a compact firm construction which will not only confine the air or other inflating medium against leakage, but will also afford the highly-desirable quality of being proof against puncture by a sharp obstacle over which the tire may travel.

My tire has an inner seamless tube 2, made of canvas or other fabric treated in a way to render it practically proof against the leakage of air. This inner tube is inclosed in a tube 3, composed of rawhide, which offers a pliable tough barrier to the penetration by glass or other sharp obstacle to the inner tube 2, so that the rawhide tube serves as the armor for the tire to render it practically punctureless. On this tube 3 is fitted another fabric tube 4 4', made of canvas or other appropriate fabric, and the layers of this tube are arranged for the warp and woof threads of the respective layers to cross one another, whereby the fabric tube 4 4' serves to confine the expansion of the tire within the limits afforded by the distension of said tube 4 4' under the pressure of the inflating medium forced into the innermost tube 2. These several tubes 2 3 4 4' are housed and inclosed within the rubber tube 5, forming the jacket of the tire, the periphery of which constitutes the tread-surface to ride upon the roadway.

The tubes are fitted tightly together to present a compact body when the tire is inflated, and the inner and outer tubes 2 5 being of seamless fabric the leakage of air is effectually provided against, even when the outer tubes are punctured so far as the armor rawhide tube 3, the tough resisting nature of which arrests the penetration of any sharp substance into and through the inner tube 2.

The tire is simple and cheap and presents the same appearance as ordinary tires of this kind, thus making it well adapted for use on wheel-rims of practically all kinds of bicycles and wheeled vehicles.

Having thus described my invention, what I claim as new, and desire to secure by Letters Patent, is—

The inflatable, non-puncturable tire, comprising the seamless innermost tube, the intermediary fabric layers, the threads of one layer crossing the threads of the other layer, the layer of rawhide interposed between said intermediary fabric layers, and the outermost seamless tube or jacket inclosing the aforesaid tubes, substantially as set forth.

In testimony whereof I affix my signature in presence of two witnesses.

LAWRENCE W. HEELAN.

Witnesses:
 J. D. ESTES,
 A. H. ESTES.